UNITED STATES PATENT OFFICE

1,972,667

FILLING MATERIAL FOR WELDING SCALE RESISTING STEELS CONTAINING ALUMINUM

Hermann Josef Schiffler, Dusseldorf, Germany

No Drawing. Application February 20, 1930, Serial No. 430,104. In Germany March 25, 1929

5 Claims. (Cl. 219—10)

As is well known scale resisting aluminum steel cannot be welded by an autogenous welding operation or the electric arc if the same material is used as filling wire. On the other hand, when the usual filling material is being used the welding seam is not scale resisting.

According to the present invention, however, welding of scale resisting steel containing aluminum can be made in such a way that also the welding seam will be scale resisting by the use of welding rods with a high chromium-content, a low carbon content and with or without nickel. Generally speaking, scale resisting steel alloys without aluminum are used as filling material. Thus, by way of example, one succeeds, by an autogenous welding operation or by electric arc welding, in welding work pieces of scale resisting steel containing aluminum having one of the following compositions:

(1) 0.08% C, 3.5% Al; (2) 0.1% C, 2.7% Al, 4.0% Cr, 0.3% Mo; (3) 0.07% C, 4.5% Al, 5.5% Cr. if, as filling, metal rods of a scale resisting steel are used. Good results have been obtained, for example, by the use of rods having the following percentage compositions:

|   | C | Cr | Ni | Mo |
|---|---|---|---|---|
| 1 | 0.10 | 14 | 2 | |
| 2 | 0.15 | 12 | 0.6 | |
| 3 | 0.15 | 13 | 0.6 | |
| 4 | 0.15–0.40 | 18–20 | 4–7 | |
| 5 | 0.30 | 22 | 22 | |
| 6 | 0.05 | 14 | | 1–3 |
| 7 | 0.02 | 18 | | 0.4–2 |
| 8 | | 30–40 | 70–80 | |

To summarize, a filling rod having 0.02 to 0.30% C, 10 to 40% Cr, with 0.6 to 0.25 Ni or 0.4 to 3% Mo, or both, may be used. In all cases the welding seams were scale resisting, the degree of scale resistance depending upon that of the welding wire. Accordingly, it is now possible to weld articles of scale resisting steel containing aluminum by an autogenous welding operation or by the electric arc welding by using the above mentioned welding steels or electrodes of the said filling material without the welding seam representing a weak spot and without excluding the use of scale resisting steels containing aluminum for certain purposes. The same fact applies also to hydrogen welding. Also in this case a satisfactory scale resisting weld may be only obtained according to above described method.

Having thus described my invention what I claim as new and desire to secure by Letters Patent is:

1. The process of welding articles composed of scale-resisting steel alloys containing aluminum amongst the elements raising the scale-resistance, which process comprises the use of a welding material consisting of an aluminum free steel alloy of approximately the same scale-resistance as said articles and containing chromium amongst the elements raising the scale-resistance.

2. The process of welding articles composed of scale-resisting steel alloys containing aluminum amongst the elements raising the scale-resistance, which process comprises the use of a welding material, consisting of an aluminum free steel alloy of approximately the same scale-resistance as said articles and containing chromium and nickel amongst the elements raising the scale-resistance.

3. The process of welding articles composed of scale-resisting steel alloys containing aluminum amongst the elements raising the scale-resistance which process consists in the use of a welding material consisting of aluminum free steel alloy of approximately the same scale-resistance as said articles and containing chromium and molybdenum amongst the elements raising the scale-resistance.

4. The process of welding articles composed of scale-resisting steel alloys containing aluminum amongst the elements raising the scale-resistance said process comprising the use of a welding material consisting of an aluminum free steel alloy of approximately the same scale-resistance as said articles and containing chromium in amounts between about 10 and 20% and nickel between about 0.6 and 25% and having a carbon content of 0.02 to 0.4%.

5. The process of welding articles composed of scale-resisting steel alloys containing aluminum amongst the elements raising the scale-resistance, said process comprising the use of a welding material consisting of an aluminum free steel alloy of approximately the same scale-resistance, as said articles and containing chromium in amounts between about 10 and 20% and molybdenum between about 0.4 and 5% and having a carbon content of 0.02 to 0.4%.

HERMANN JOSEF SCHIFFLER.